(12) United States Patent  (10) Patent No.: US 8,335,701 B1
Syed et al.  (45) Date of Patent: Dec. 18, 2012

(54) SYSTEM AND METHOD FOR DETERMINING OPPORTUNITIES AND PEER INFORMATION FOR INSURANCE POLICIES

(75) Inventors: Kabir Syed, Greenwich, CT (US); Robert Howe, Colts Neck, NJ (US); Anneloes Hesen, New York, NY (US)

(73) Assignee: Marsh USA Inc., New York, NY (US)

( * ) Notice: Subject to any disclaimer, the term of this patent is extended or adjusted under 35 U.S.C. 154(b) by 0 days.

(21) Appl. No.: 13/359,078

(22) Filed: Jan. 26, 2012

Related U.S. Application Data

(63) Continuation of application No. 13/285,189, filed on Oct. 31, 2011.

(51) Int. Cl.
*G06Q 40/00* (2012.01)

(52) U.S. Cl. .......................................................... 705/4

(58) Field of Classification Search ........................ 705/4
See application file for complete search history.

(56) References Cited

U.S. PATENT DOCUMENTS

| | | | |
|---|---|---|---|
| 5,523,942 A | 6/1996 | Tyler et al. | |
| 5,655,085 A | 8/1997 | Ryan et al. | |
| 6,647,374 B2 | 11/2003 | Kansal | |
| 6,871,181 B2 | 3/2005 | Kansal | |
| 7,343,309 B2 | 3/2008 | Ogawa et al. | |
| 7,383,239 B2 | 6/2008 | Bonissone et al. | |
| 7,567,914 B2 | 7/2009 | Bonissone et al. | |
| 7,801,748 B2 | 9/2010 | Bonissone et al. | |
| 7,813,945 B2 | 10/2010 | Bonissone et al. | |
| 7,877,279 B1 | 1/2011 | Sturgis et al. | |
| 8,024,203 B2 | 9/2011 | Kendall et al. | |
| 2006/0053037 A1* | 3/2006 | Kendall et al. | 705/4 |
| 2010/0010836 A1* | 1/2010 | Rosen et al. | 705/4 |

* cited by examiner

*Primary Examiner* — Eric T Wong

(74) *Attorney, Agent, or Firm* — Fay Kaplun & Marcin, LLP

(57) ABSTRACT

Systems and methods for providing insurance companies with historical data indicating their placement results versus peer insurance companies with a broker and proactively identify upcoming policy opportunities from a broker. The systems and methods configured to store placement information for insurance policies, receive policy criteria selection information from a user, wherein at least a portion of the policy criteria selection information is unique to an insurance company associated with the user, determine opportunity information based on the policy criteria selection information, the opportunity information including data for insurance policies that are one of scheduled to expire and scheduled for submission to insurance companies within a predetermined time frame, determine historical information based on the policy criteria selection information, the historical information including performance metrics for the insurance company and average performance metrics for peer insurance companies and provide the opportunity information and historical information to the user.

18 Claims, 9 Drawing Sheets

Fig. 2

Accounts in Your Preference Total: 10,065

| ClientID | Coverage Line | Industry Group | Expiration Date | Placement Solution | Hub | Hub Leader | Broker |
|---|---|---|---|---|---|---|---|
| CN101181230 | Boiler & Machinery Commerc... | Real Estate | 02/01/2011 | NB | Chicago | | |
| CN101182007 | Auto Liability/Physical Damage | Forest & Paper | 01/01/2011 | NB | Seattle | Susie Cantwell | Jenelle, May |
| CN101182007 | Excess Liability | Forest & Paper | 01/01/2011 | NB | Seattle | Susie Cantwell | Jenelle, May |
| CN101182007 | General Liability | Forest & Paper | 01/01/2011 | NB | Seattle | Susie Cantwell | Jenelle, May |
| CN10118204B | Automobile Liability | Municipalities & Government | 03/17/2011 | NB | Charlotte | Mark Slaydon | Lynn, Claxton |
| CN10118545S | Excess Liability | Consumer Products | 01/01/2011 | Other | Placed Locally | | |
| CN10118545S | Multi-Peril Casualty | Consumer Products | 01/01/2011 | Other | Placed Locally | | |
| CN10118547O | Auto-Liability/Physical Damage | Wholesale | 01/01/2011 | Other | ACS/JCS | | |
| CN10118547O | Fidelity Bond | Wholesale | 01/01/2011 | Other | ACS/JCS | | |
| CN10118547O | General Liability | Wholesale | 01/01/2011 | Other | ACS/JCS | | |
| CN10118547O | Property/All Risk | Wholesale | 01/01/2011 | Other | ACS/JCS | | |
| CN10118547O | Workers Compensation | Wholesale | 01/01/2011 | Other | ACS/JCS | | |
| CN10118579S | Property/All Risk | Construction | 04/01/2011 | GRM | Placed Locally | Charles Ryland ... | David, Ghilardi |
| CN1011B583l | Umbrella Liability | Wholesale | 01/01/2011 | GRM | Dallas | Janice Collins ... | |
| CN1011B583l | Umbrella Liability | Wholesale | 04/08/2011 | Other | Detroit | | Vincent Zollo ... |
| CN10118636Z | Inland Marine | Wholesale | 02/01/2011 | NB | Placed Locally | | Yvonne, Killian |
| CN10118676J | Excess Liability | Others Services | 02/01/2011 | NB | San Francisco | Susie Cantwell ... | Yvonne, Killian |
| CN10118676J | International Package Policy | Others Services | 02/01/2011 | NB | San Francisco | Wayne Guo | Yvonne, Killian |
| CN10118676J | Multi-Peril Casualty | Others Services | 02/01/2011 | NB | San Francisco | Susie Cantwell ... | |
| CN10118793J | International Casualty | Food & Beverage | 03/01/2011 | GRM | Boston | Paul Therrien | Matthew, Biggart |

METHOD -- 500

Fig. 9

SYSTEM AND METHOD FOR DETERMINING OPPORTUNITIES AND PEER INFORMATION FOR INSURANCE POLICIES

BACKGROUND INFORMATION

Insurance brokers generally work for clients who desire to purchase insurance policies by interacting with multiple insurance companies to obtain for the client favorable coverage at favorable prices. The goal of the insurance broker is to provide the client with multiple quotes from multiple insurance companies so the client can compare the price, policy provisions, the level of service by the insurance company, etc., to select the insurance company that is the best fit for the client.

In addition to this work with the client, the insurance broker is also looking to enhance relationships with the insurance company and increase the number of instances for which the insurance company provides a quote based on submissions provided by the broker to the insurer. Certain insurance brokers are also looking to provide valuable information and services to insurance companies as a service provider to them. In order to do this, the broker desires to understand the types of policies that the insurance company is likely to quote. This helps (i) the insurance company by not having to review submissions that they are unlikely to bid on, (ii) the insurance broker who can target each submission to those insurance companies who are likely to provide a quote and (iii) the client who will then receive the most relevant quotes for the desired insurance. While this is the desired goal of all three parties to the transaction, the process of accomplishing these goals could be made simpler and more efficient.

The interaction of the insurance broker with both clients and insurance companies allows the insurance broker to collect a large amount of information concerning a large number of policy transactions. It would be advantageous if this information collected by the insurance broker could be leveraged to promote the three goals described above.

SUMMARY OF THE EXEMPLARY EMBODIMENTS

A broker arrangement having a memory storing placement information for insurance policies, an opportunity tool receiving policy criteria selection information from a user, wherein at least a portion of the policy criteria selection information is unique to an insurance company associated with the user, the opportunity tool further determining opportunity information by searching the placement information based on the policy criteria selection information, the opportunity information including data for insurance policies that are one of scheduled to expire, scheduled to renew and scheduled for submission to insurance companies within a predetermined time frame, a historical tool receiving the policy criteria selection information and determining historical information by searching the placement information based on the policy criteria selection information, the historical information including performance metrics for the insurance company and average performance metrics for peer insurance companies and a user interface arrangement providing the opportunity information and historical information to the user, wherein the opportunity information and historical information is organized based on the policy criteria selection information received from the user.

A method for storing placement information for insurance policies, receiving policy criteria selection information from a user, wherein at least a portion of the policy criteria selection information is unique to an insurance company associated with the user, determining opportunity information based on the policy criteria selection information, the opportunity information including data for insurance policies that are one of scheduled to expire, scheduled to renew and scheduled for submission to insurance companies within a predetermined time frame, determining historical information based on the policy criteria selection information, the historical information including performance metrics for the insurance company and average performance metrics for peer insurance companies and providing the opportunity information and historical information to the user, wherein the opportunity information and historical information is organized based on the policy criteria selection information received from the user.

BRIEF DESCRIPTION OF THE DRAWINGS

FIG. 2 shows an exemplary graphical user interface (GUI) that an insurance company may access to identify upcoming policy opportunities.

FIG. 4 shows a second exemplary result view GUI for the search of the placement information by the opportunity tool.

FIG. 9 shows an exemplary result view GUI for the search of the placement information by the historical tool based on lost opportunities.

DETAILED DESCRIPTION

Figure 1:
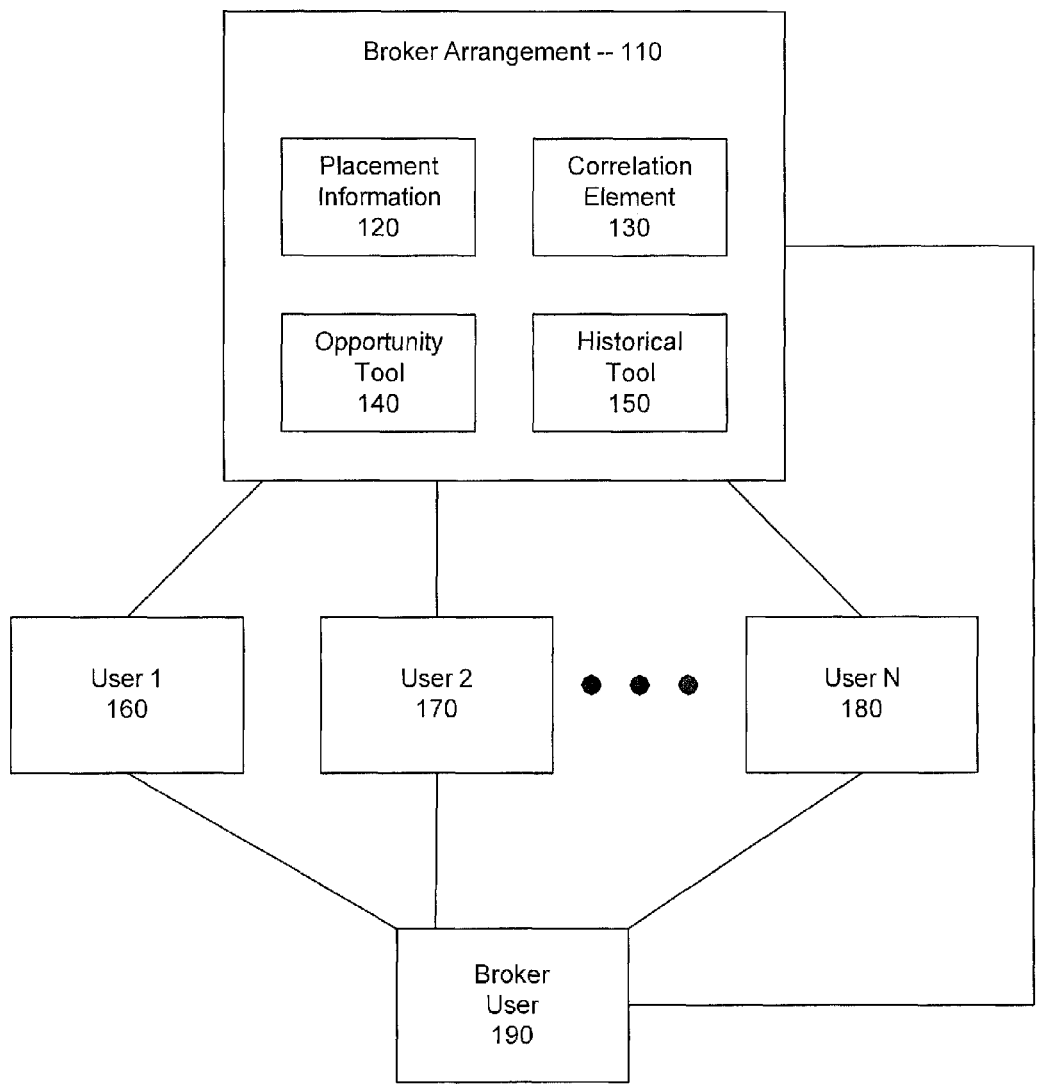
FIG. 1 shows an exemplary system for implementing the proactive and historical policy review.

The exemplary embodiments may be further understood with reference to the following description of the exemplary embodiments and the related appended drawings, wherein like elements are provided with the same reference numerals. The exemplary embodiments are related to systems and methods for providing insurance companies with historical data indicating their placement results versus peer insurance companies and proactively identify upcoming policy opportunities from a broker based on the insurance company's preferences. The exemplary embodiments allow the insurance broker to collaborate with each participating carrier to review key production indicators leading to the creation and execution of a tactical plan designed to help improve relationships and carrier performance.

Prior to describing the functionality provided by the exemplary embodiments, several terms will be defined as they are used throughout this description. The term "client" will be used to refer to the buyer or prospective buyer of an insurance policy. The term "insurance company," "insurance carrier" or "carrier" will be used to refer to the seller or prospective seller of the insurance policy. Users of the exemplary embodiments may be associated with an insurance company. As will be described in greater detail below, the functionality imparted by the exemplary embodiments is generally directed at helping an insurance company better understand both their opportunities for selling insurance policies and their results in attempting to sell such policies. The term "insurance broker" or "broker" will be used to describe an entity that has a relationship with both the client and the insurance company to facilitate the buying of the insurance policy. Users of the exemplary embodiments may also be associated with the broker. Typically, the client will approach the insurance broker with a request for a particular type of insurance policy (e.g., general liability policy, property policy, excess casualty policy, etc.). The insurance broker will then make this request available to many different insurance companies. This making of the request available to the insurance company is referred to herein as a "submission." After receiving the submission, the insurance company will decide whether to offer a policy in accordance with the submission to the client. This offer is referred to herein as a "quote." It is generally the goal of the broker to make a submission based on the request to multiple insurance companies to provide the client with multiple quotes for the type of policy the client desires to purchase. After receiving the quotes, the client will then select the insurance company (or companies) from which they desire to purchase the policy based on the client's requirements (e.g., price, policy provisions, etc.). The client will then bind the policy with the selected carrier (or carriers). The process of "binding" the policy may include for example, making an initial payment for the policy, executing a binder agreement with the insurance company, etc. Each insurance company may have a different process for binding and the binding process may also depend on the type of insurance. However, once this process is completed, the insurance policy is considered "bound."

Because the broker is the middle man in these types of transactions, the broker can collect various information concerning each of the transactions, such as the type of policy, the amount of the policy, the policy period, specifics about the client (e.g., client market capitalization, number of employees, etc.), the insurance companies that quoted the policy, etc. The broker may collect this information, for example, to satisfy regulatory or compliance requirements. However, in addition to such regulatory or compliance reasons, the broker may also make this information available to the insurance companies in the manners described herein.

FIG. 1 shows an exemplary system 100 for implementing the proactive and historical policy review. A broker arrangement 110 provides the functionality described herein. As described above, the broker is generally the entity that may collect the information that is needed to implement the exemplary embodiments and throughout this description, it will be assumed that the broker is the entity that gathers this information and hosts the broker arrangement 110. However, it is not necessary that it be an insurance broker that collects this information and hosts the broker arrangement 110. Another third party, separate from the insurance company and client, may collect the information and/or host the broker arrangement 110.

The broker arrangement 110 includes the collected placement information 120. This information may include the information described above, any additional placement information described herein and other placement information not specifically described herein that may be useful in implementing the described functionality. For example, in addition to the information described above, the placement information may include information as to the specific insurance companies to which submissions were made for a particular policy, and the placement information may also include the insurance companies that submitted a quote for the policy and the particulars of the quote (e.g., price, policy provisions, etc.). Thus, from these examples, it should be clear that placement information 120 is not limited to information concerning specific client placements. The placement information 120 may be stored and indexed such that it is searchable based on any number of parameters that are stored for the placement information 120. As will be described in greater detail below, the opportunity tool 140 and the historical tool 150 will search the placement information for opportunity information and historical performance information, respectively. This searching may be performed based on any of the stored variables that have been indexed in the placement information 120. Thus, the placement information 120 may be stored in any known manner in which indexing the information is possible, e.g., a database, tables, data arrays, etc.

The broker arrangement 110 further includes a correlation element 130. As will be described in greater detail below, different insurance company users may describe certain placement information differently. Thus, the placement information needs to be correlated such that each insurance company user sees the information in a manner that is useful to that particular insurance company user. The correlation element 130 will be described in greater detail below.

The opportunity tool 140 is the element that uses the placement information 120 to identify policy opportunities for the insurance company. The historical tool 150 is the element that uses the placement information 120 to provide the insurance company with information concerning its placement results versus other insurance companies. Each of these tools 140 and 150 will be described in greater detail below.

It is noted that in the below description, the opportunity tool 140 and historical tool 150 are described as separate elements. This distinction was only to differentiate the type of functionality provided by these tools. Those skilled in the art will understand that these functionalities may also be performed by a single element with the results being provided simultaneously. For example, when searching the placement information 120 for opportunity information a corresponding search for historical information may also be performed using the same criteria by the same element. Thus, there is no requirement that the functionality provided by the historical tool 150 and the opportunity tool 140 be included within separate operating elements. In fact, the simultaneous provision of the opportunity information and historical information based on the same search criteria may provide the insurance company user with more context for the provided information.

As shown in FIG. 1, each of user 1 (160) through user N (180) has access to the broker arrangement 110. This access may be, for example, web based access where each of the tools 140 and 150 hosts various graphical user interfaces (GUIs) where the insurance company user can access the functionalities provided by the broker arrangement 110. Again, throughout this description, the users 160, 170, 180 will be described as insurance company users, but it should be understood that users are not limited to insurance company users. For example, FIG. 1 also shows a broker user 190 that has access to the profile of an insurance company user (or users) so that the broker can generate reports or data that it may share with the insurance company. The access of the broker user 190 to the broker arrangement 110 is illustrated as occurring via the insurance company users 160-180 because, in one example, when the broker user 190 accesses the broker arrangement 110 to view a carrier's details, the broker user 190 first selects which market the broker user 190 desires to impersonate, and then which carrier user 160-180 the broker user 190 wants to view. Thus, in this example, the broker user 190 is impersonating one of the insurance company users 160-180. It should be noted that this impersonation is only an example of a manner that the broker user 190 can access the broker arrangement 110. The broker user 190 may also have direct access to the broker arrangement 110 as also shown in FIG. 1.

Figure 2:
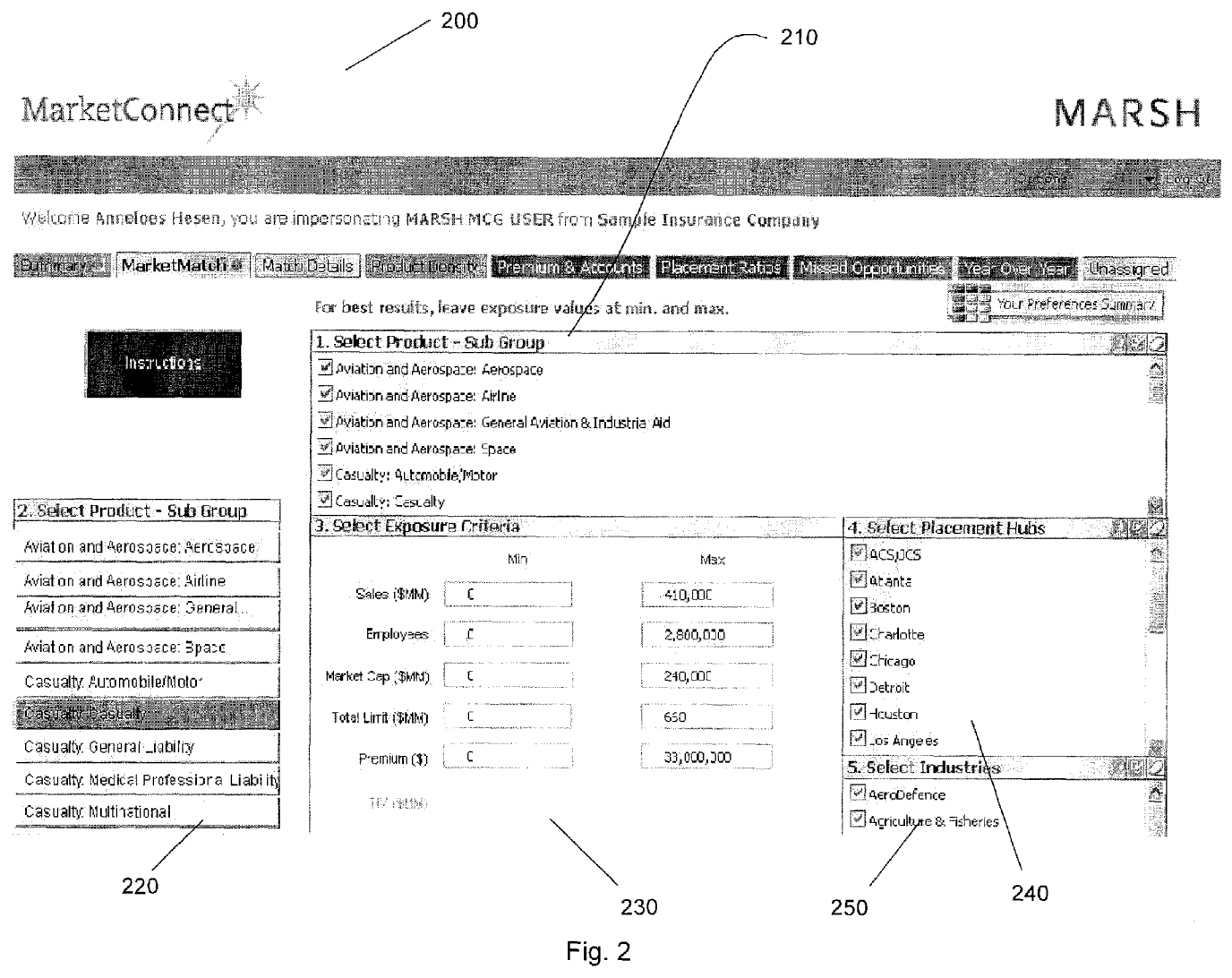

Initially, the functionality relating to proactively identifying policy opportunities associated with the opportunity tool 140 will be described. FIG. 2 shows an exemplary graphical user interface (GUI) 200 that an insurance company may access to identify upcoming policy opportunities. As will be described in greater detail below, the exemplary embodiments allow the insurance company to select multiple variables concerning the types of policies that the insurance company desires to target. The first two fields 210 and 220 show examples of the various types of policy areas that the insurance company may desire to target. Those skilled in the art will understand that there are numerous types of policies and the listing shown on the GUI 200 is only exemplary. As can be seen in this example, the user may select one or more product groups and/or product subgroups using either the field 210 or 220. As noted above, the types of product groups and/or subgroups shown in the listing may be specific to the insurance company user that is accessing the system. That is, different insurance companies may classify the same policy into different policy groups and/or subgroups. Thus, the correlation element 130 will correlate the types of policy individually to the particular insurance company user. The correlation element 130 and corresponding process will be described in greater detail below.

In the next field 230, the user may select various exposure criteria. In this example, the exposure criteria include client sales values, number of client employees, client market capitalization, policy limits, and premium values. Those skilled in the art will understand that the listed exposure criteria are only exemplary and it is possible that other exposure criteria may also be used. As can be seen from the example, the user may select lower and upper bounds for the exposure criteria so the results meet these criteria. As described above, the broker may collect information concerning each of these criteria and store this information for each policy, thereby making this information searchable or filterable.

The field 240 is a further filter that is based on placement hubs or centers for the broker. That is, a national broker may have placement offices or hubs in various locations (e.g., Atlanta, Boston, Charlotte, . . . , in the example of FIG. 2). The insurance company may desire to target particular placement hubs and therefore, may select one or more placement hubs in this field 240. The field 250 is an industry field where the user may select the particular industry that the insurance company desires to target. In this example, the AeroDefense and Agriculture & Fisheries industries are shown, but those skilled in the art will understand that the user may scroll through any number of industries and select one or more of these industries.

After the user has selected all the criteria in the GUI 200, the user may submit the search to the opportunity tool 140 to obtain the results. However, it is noted that the fields and corresponding criteria shown on GUI 200 are only exemplary and other fields and criteria may also be selected by which the placement information 120 may be searched. For example, other criteria may include the total insured value (TIV), TIV by event (e.g., earthquake TIV, windstorm TIV), a number of vehicles to be insured, the option to select a particular client segment (e.g., Global Risk Management (GRM), National Brokerage (NB), Other) or to select guaranteed cost or loss sensitive. Thus, from these examples, it can be seen that there are any number of criteria that may be used to search the placement information 120.

Prior to describing the results of the search that will be performed by the opportunity tool 140 of the placement information 120, it has been stated throughout this description that the exemplary embodiments allow the insurance company to target the types of policies the insurance company desires to write, but several examples of such targeting will be provided. For example, a particular insurance company may decide that its policy portfolio is deficient in a particular type of coverage such as aviation related policies. Thus, the insurance company may use the opportunity tool 140 to target these types of policies via the selection fields 210 and/or 220 in GUI 200. In another example, the insurance company may decide that it desires to target all types of policy types for mid-size companies. In this example, the user may select all policy types in the policy selection field 210, but limit the size of the company in the exposure criteria field 230, e.g., by sales, employees, market capitalization, etc. In another example, the insurance company may target a particular insurance policy limit by selecting the policy limit criteria in the criteria field 230. In a final example, the insurance company may determine that it is deficient in a particular geographical area, e.g., the Pacific Northwest. In such a case, the insurance company may select a placement hub of Seattle in the placement hub field 240 of the GUI 200. From these examples, it should be apparent that the insurance company user may customize the search for policy opportunities based on any number of variables and the opportunity tool 140 may then conduct the search of the placement information 120 to meet the desired variables.

Also, prior to describing the results, it has been described above that the broker arrangement 110 also includes a correlation element 130 to correlate information for each of the individual insurance company users 160-180. This correlation functionality is applicable to both the opportunity tool 140 and the historical tool 150. The correlation function allows the broker arrangement 110 to be customized for each of the insurance company users 160-180 such that both the searching of the placement information 120 and the results of such searching are presented to the individual insurance company user 160-180 in a manner consistent with the practices of the individual insurance company. For example, referring to FIG. 2, various entries in the fields 210 and 220 are displayed. These entries may be referred to as Product Groups and/or Product Subgroups. In this example, some of the Product Groups/Subgroups include "Aviation and Aerospace: Aerospace," "Aviation and Aerospace: Airline," "Casualty: Automobile/Motor" and "Casualty: Casualty." Thus, from these examples it can be seen that some of the categories of Product Groups/Subgroups are very specific, while some are very general. It may be considered that in this instance, it is insurance company user 160 that is currently accessing the broker arrangement 110 via the GUI 200. Thus, the insurance company associated with insurance company user 160 has defined their desired Product Groups/Subgroups in this manner. However, another insurance company may define different Product Groups/Subgroups. For example, insurance company user 170 may be associated with a different insurance company than insurance company user 160 and, thus, when insurance company user 170 accesses the broker arrangement 110 via the GUI 200, the listing of the Product Groups/Subgroups in the fields 210 and 220 may be different based on the manner in which the insurance company associated with insurance company user 170 has defined their Product Groups/Subgroups.

However, it is not merely enough to define different Product Groups/Subgroups for each insurance company user 160-180, but each type of policy needs to fit into one of the company's categories for the search to identify all the possible opportunities and/or historical information for the insurance company. Continuing with the example started above, the insurance company user 160 may be searching for opportunities and/or historical information concerning policies related to airlines and therefore, this insurance company user 160 will select the Product Group/Subgroup of "Aviation and Aerospace: Airline." In contrast, the insurance company user 170 may not have the same Product Group/Subgroup, but may be looking for the same airline related policies. For example, the insurance company user 170 may only have a Product Group defined as aviation. Thus, in this example, a policy related on an airline should appear in search results for insurance company user 160 when the Product Group/Subgroup of "Aviation and Aerospace: Airline" is selected and the same policy should also appear in search results for insurance company user 170 when the Product Group of /Subgroup of aviation has been selected.

The correlation element 130 is used to correlate each type of policy with the Product Group/Subgroup that are identified for each insurance company user 160-180. For example, the broker may define a broker specific code or use an industry standard code (e.g., Standard Industrial Classification (SIC) codes) to identify each policy or policy inquiry. Each insurance company user 160-180 may then identify to the administrator of the broker arrangement 110 how each code should be correlated to the Product Group/Subgroup offered by the insurance company. This correlation of broker/industry codes may then be stored in the correlation element 130. Thus, when the opportunity tool 140 or the historical tool 150 receive a request from the particular insurance company user 160-180 that includes an identification of specific Product Groups/Subgroups, the correlation element 130 will identify the type of policies that correlate to the selected Product Groups/Subgroups (e.g., based on the broker/industry codes). In this manner, all policies that the insurance company desires to associate with selected Product Groups/Subgroups will be identified by the opportunity tool 140 or historical tool 150 when searching the placement information 120.

It should be noted that there are other manners of correlating that do not rely on the insurance company user instructing the administrator of the broker arrangement 110 as to the initial correlation. For example, there can be default correlations that are stored in the correlation element 130. In another example, the correlation element 130 may include a learning algorithm that identifies correlations based on the insurance company user's selections. It is also noted that while the correlation element 130 is shown as a separate element, the functionality of the correlation element 130 may be embedded in one of the other elements, e.g., placement information 120, opportunity tool 140, historical tool 150.

It is also noted that the Product Group/Subgroup information may not be the only type of information that may need to be correlated in the placement information 120 for the different insurance companies. In another example, different insurance companies may have different descriptions for industry groups (e.g., the industry group field 250 of GUI 200 or column 430 of result GUI 400). In the same manner as described above for the Product Group/Subgroup correlation, each client may be assigned a broker code or an industry standard code (e.g., an SIC code) that is stored in the correlation element 130. The individual insurance company may again inform the administrator of the broker arrangement 110 of the initial correlation between the client industry and its defined industry group. This will also be stored in the correlation element 130 so that all policies that the insurance company desires to associate with selected industry groups will be identified by the opportunity tool 140 and/or historical tool when searching the placement information 120.

From the above examples, it can be seen that the correlation element 130 allows for customized searching and search results for each of the insurance company users 160-180. In this way, a specific insurance company user 160-180 may define search criteria of the placement information 120 to find the information in the most relevant manner for the user. Similarly, the search results may be organized and displayed to the individual insurance company user 160-180 in the most relevant manner for the user. Examples of results are provided below.

Figure 3:
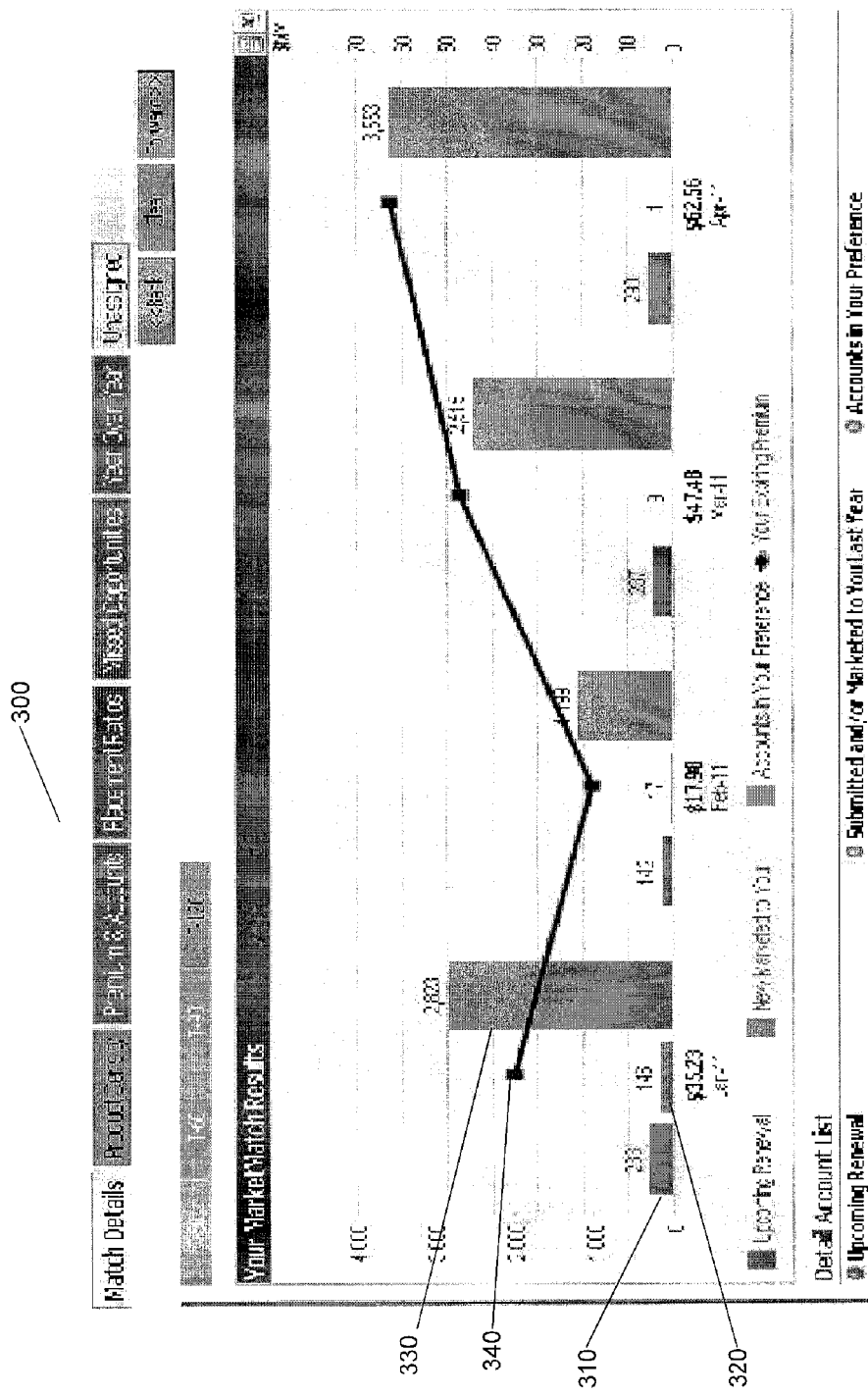
FIG. 3 shows a first exemplary result view GUT for the search of the placement information by the opportunity tool.

FIG. 3 shows a first exemplary result view GUI 300 for the search of the placement information 120 by the opportunity tool 140. This particular GUI 300 shows the information based on opportunities for the next 120 days. However, those skilled in the art will understand that the results view may be delivered based on any time frame. The result view GUI 300 is a generalized view that shows the results based on the variables selected by the insurance company user, for example, as entered in GUI 200.

In this example, the number of policies that meet the user's criteria is broken down between renewal policies for the insurance company and policies for new prospective clients. As described above, the broker is able to collect certain information such as when a new client or a client for a new policy makes a request. This information is stored in the placement information 120 and is searchable by the opportunity tool 140. In this particular example, during the next 30 days (labeled as January 11) in the GUI 300, there are 146 policies 320 in new prospective clients for the user that match the user's criteria. In this context, the term "new prospective clients" refers to any policy opportunity where the insurance company is not the incumbent provider of the policy. These could include policies up for renewal that are currently written by another insurance company (whether or not the insurance company received a prior submission for the current policy) or where the client is requesting a new policy. Since the broker has the information on policies that have been written, the placement information 120 will also include when a policy will expire (e.g., be ready for renewal). Thus, in this example, during the next 30 days there are 288 renewal policies 310 for the insurance company. In this example, the renewal policies refers to policies that are currently written by the insurance company that are up for renewal within the defined time period. Thus, the view of FIG. 3 provides the insurance company user 160-180 with an overview of expiring policies written by the insurance that are up for renewal and with potential policies in new prospective clients that match the selected criteria.

Additional information may also be provided to the insurance company user 160-180 to provide context when viewing the data. For instance, the results may also include the number of policies that match the preferences selected by the user, e.g., 2,832 policies 330 in this example. Thus, in this example, the total number of policies that match the preferences selected by the user is the 2,832 policies 330 plus the 146 policies 320. The difference between the policies 320 and 330 is that the policies 320 are the specific subset of policies that match the criteria and have been either previously submitted to and/or quoted by the insurance company (e.g., in a previous policy period) or have been selected by the broker for submission to the insurance company. The policies that match the criteria, but do not fit into the above described categories are placed in the policies 330. This difference may also correspond to the type of information to which the insurance company user 160-180 has access. For example, since the insurance company has either previously quoted and/or has already been selected to receive a submission for the policies 320, the insurance company user 160-180 may be permitted to see the client name for these policies. In contrast, the insurance company user 160-180 may not have access to the client names for the policies 330. Other information may include an indication of the amount of expiring policy value 340 that the insurance company has with the broker in that particular time frame. Again, the placement information 120 may include all the policies that the insurance company has written through the broker. Thus, all expiring policy amounts or policies that match the criteria that are expiring may be shown to the user to provide the context. The results for the remaining months, e.g., 60 days, 90 days, and 120 days, are also shown.

FIG. 4 shows a second exemplary result view GUI 400 for the search of the placement information by the opportunity tool 140. This exemplary result GUI 400 shows a more specific list of results that identifies specifics related to the policies that fit the criteria inputted by the insurance company user. In this example, the information provided by the result GUI 400 includes the client ID 410, the coverage line 420, the industry group 430, the current policy expiration date 440, the placement solution 450, the placement hub 460, the hub leader 470 and the individual broker 480. The insurance company user may then review the results and determine which opportunities the insurance company desires to pursue, e.g., identify those opportunities for which the insurance company desires to receive a submission.

Those skilled in the art will understand that the information shown on this GUI 400 is only exemplary and any other information that is included in the placement information 120 for the particular policies may be displayed. However, it is also noted that some information may be withheld from the insurance company users 160-180. For example, the client ID 410 is only shown as a code value without identifying particular client names. On the other hand, the broker may be authorized or elect to display this information for certain clients. Thus, the broker may identify information within the placement information 120 as viewable or non-viewable by the insurance company users 160-180. This identification may be based on individual pieces of information or based on types or categories of information. Accordingly, the information displayed on a result GUI such as GUI 400 may vary depending on the level permissions granted by the clients or other factors.

In addition to generating the result GUI 400 for the individual insurance company user 160-180, the opportunity tool 140 may also generate a corresponding report for the broker user 190 with corresponding information. For example, the broker user 190 will receive the report indicating the types of opportunities the insurance company desires to pursue. As described above, the broker user 190 may impersonate any one of the insurance company users 160-180 and thus have access to the specific searches and/or results that have been performed by the specific insurance company user 160-180. It is also noted that the corresponding report that is generated for the broker user 190 may have more information than the information that is shown to the insurance company users 160-180. For example, the report generated for the broker user 190 may include the client names (in addition to the client ID), as well as exposure specific information. The broker may then consult with the insurance company regarding the opportunities as to which the insurance company desires to receive submissions. For example, the insurance company may target a specific policy and identify this policy to the broker. However, the broker may indicate to the insurance company that this is a policy for which the insurance company will not receive a submission—for a variety of reasons. On the other hand, by working from the same list of opportunities, the insurance company and the broker may determine any number of opportunities for which the insurance company is suited, and with the client's permission, will make a submission to the insurance company for a quote. In another example, the broker user 190, after receiving the report, may suggest some variations to the insurance company user 160-180 to more narrowly focus on opportunities for the particular insurance company.

In these ways, the insurance company may identify and proactively pursue submissions for policies where the insurance company has an active interest in pursuing. In addition, it allows the insurance broker to understand the types of policies that the insurance company desires to pursue providing the parties a format for more structured, focused conversations around a greater number of identified opportunities.

Figure 5:
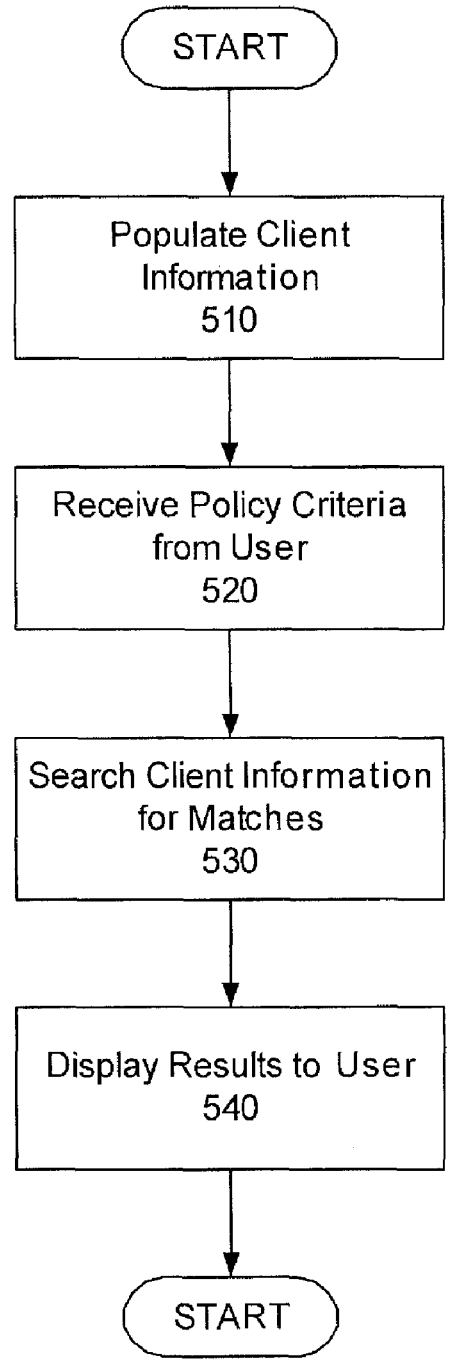
FIG. 5 shows an exemplary method for operation of the opportunity tool.

FIG. 5 shows an exemplary method 500 for operation of the opportunity tool 140. In a first step 510, the placement information 120 is populated. It is noted that while this method is described as an exemplary operation of the opportunity tool 140, it is possible that the placement information 120 is populated via an unrelated operation. For example, as described above, the broker may collect the information used to populate the placement information 120 via a compliance process and this information may then be imported to populate the placement information 120. This step 510 is provided in this method 500 to indicate that the opportunity tool 140 will operate on the information that is available in the placement information 120.

In a next step 520, the opportunity tool 140 receives policy criteria from the insurance company user 160-180, for example, via the GUI 200. As described extensively above, the opportunity tool 140 allows the insurance company user 160-180 to select the specific criteria for the opportunities that the insurance company desires to pursue.

After receiving the criteria from the insurance company user, the method proceeds to step 530 where the opportunity tool 140 searches the placement information 120 for policy information that matches the criteria. In step 540, the opportunity tool 140 provides the results to the insurance company user. The results may be provided, for example, via the GUIs 300 and 400. In addition, as described above, the results may also be provided to the broker user 190 so that the insurance company may consult with the broker regarding specific opportunities for submission identified by the opportunity tool 140.

The opportunity tool 140 also provides a further functionality referred to as a product density analysis for the insurance company. The product density analysis may be considered to be an analysis of all the policies for a particular client where the insurance company is currently an incumbent carrier for at least one coverage line for that client. To provide a specific example, the insurance company may currently provide a General Commercial liability policy for a client. Thus, this insurance company has a pre-established relationship with the client because it currently underwrites this General Commercial liability policy. The insurance company may desire to leverage this relationship to offer other coverage to the client. However, the insurance company does not know what other types of coverage lines of the client that the client obtains through the broker. The product density analysis provided by the opportunity tool 140 may provide this information to the insurance company so the insurance company may seek submissions from the broker for these other types of policies (e.g., Excess Liability, Auto Liability, etc.).

This functionality is provided using the data stored in the placement information 120. For example, each policy that is related to a particular client may be indexed to other policies for that client. The opportunity tool 140 may search the index to provide a listing of all other policies that are related to the client, but are not currently provided by the insurance company conducting the search. Once the insurance company has this information, the insurance company may approach the broker to discuss receiving submissions for these other policies as they come due for renewal. In this manner, the insurance company may target a client with which the insurance company feels they have a good relationship to whom they would desire to offer additional quotes and can bind additional business if the quotes are provided and accepted.

Figure 8:
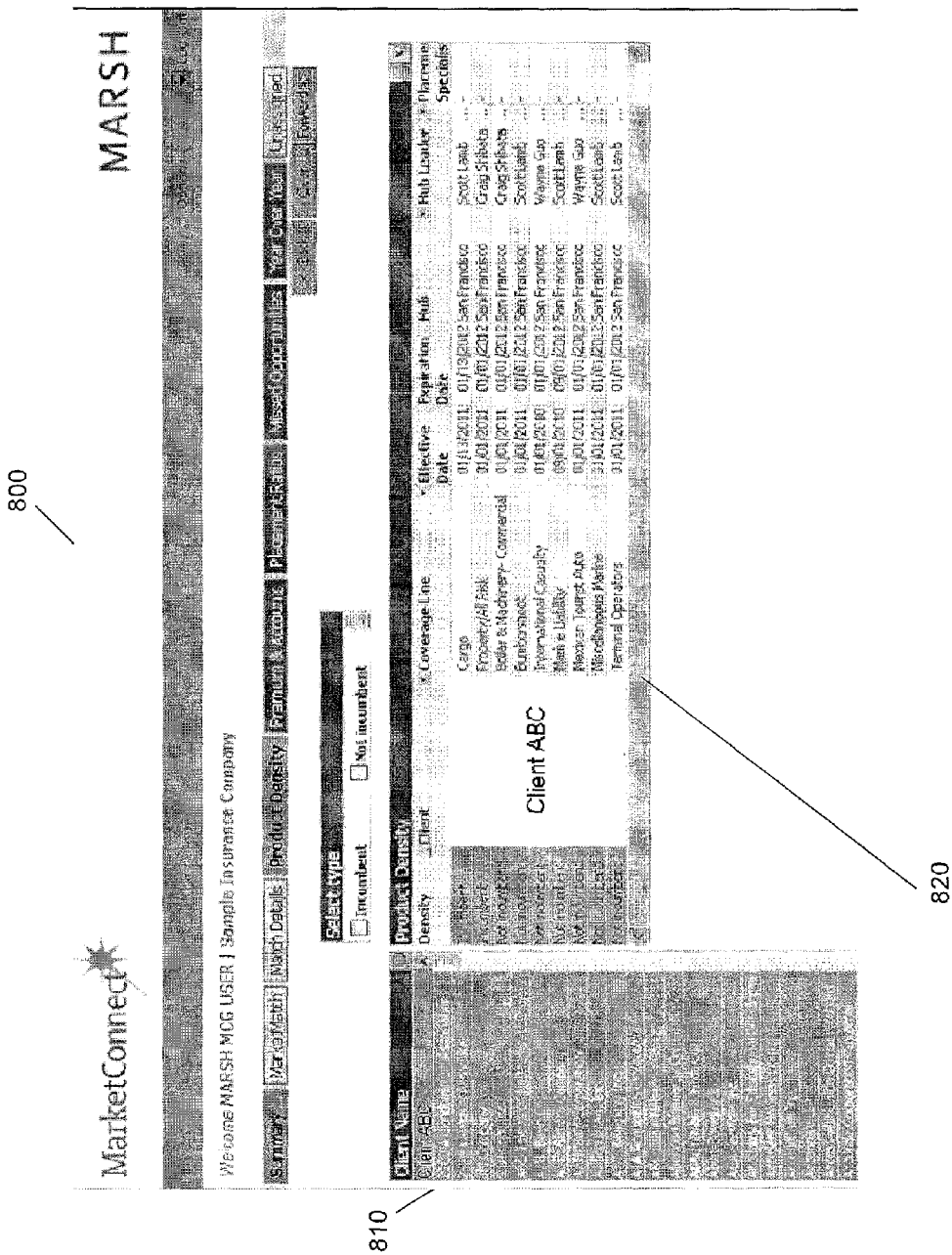
FIG. 8 shows an exemplary result view GUI for the search of the placement information by the opportunity tool based on a product density for a particular client.

FIG. 8 shows an exemplary result view GUI 800 for the search of the placement information 120 by the opportunity tool 140 based on a product density for a particular client. The GUI 800 in the field 810 lists the clients by name for the particular insurance company. The field 820 shows the information for a particular client that is selected from the field 810. For example, the information includes all the coverage lines for the particular client, whether the insurance company is an incumbent or non-incumbent for the coverage line, the expiration date for the coverage line and various other information for the particular coverage line. In this example, it can be seen that the insurance company user 160-180 may easily identify those coverage lines which the insurance company would like to target for the client.

The functionality provided by the historical tool 150 of the broker arrangement 110 will now be described. As described above, the general description of the functionality of the historical tool 150 is the comparison of the particular insurance company versus its peers (as a group). This comparison may include, for example, the number of submissions the insurance company has received, the number of quotes based on these submissions, the number of bound policies based on these quotes, etc.

Initially, the historical tool 150 will receive the same or similar type of information from the insurance company user 160-180 that is received by the opportunity tool 140. For example, the GUI 200 may be used to input the same criteria to the opportunity tool 140 and the historical tool 150. Thus, the insurance company user may see both the opportunities that correspond to the selected criteria, but also the historical comparison of how the insurance company does against its peers for policies that fit within the selected criteria. Accordingly, the above description with respect to the GUI 200 and criteria selection is also applicable to receiving input for the historical tool 150. Also similar to the opportunity tool 140, the historical tool 150 will use these input criteria to search the placement information 120 for matching results. However, the difference is that the results of the historical tool 150 is a backward look at performance based on the criteria, instead of being forward looking as the results of the opportunity tool 140.

Figure 6:
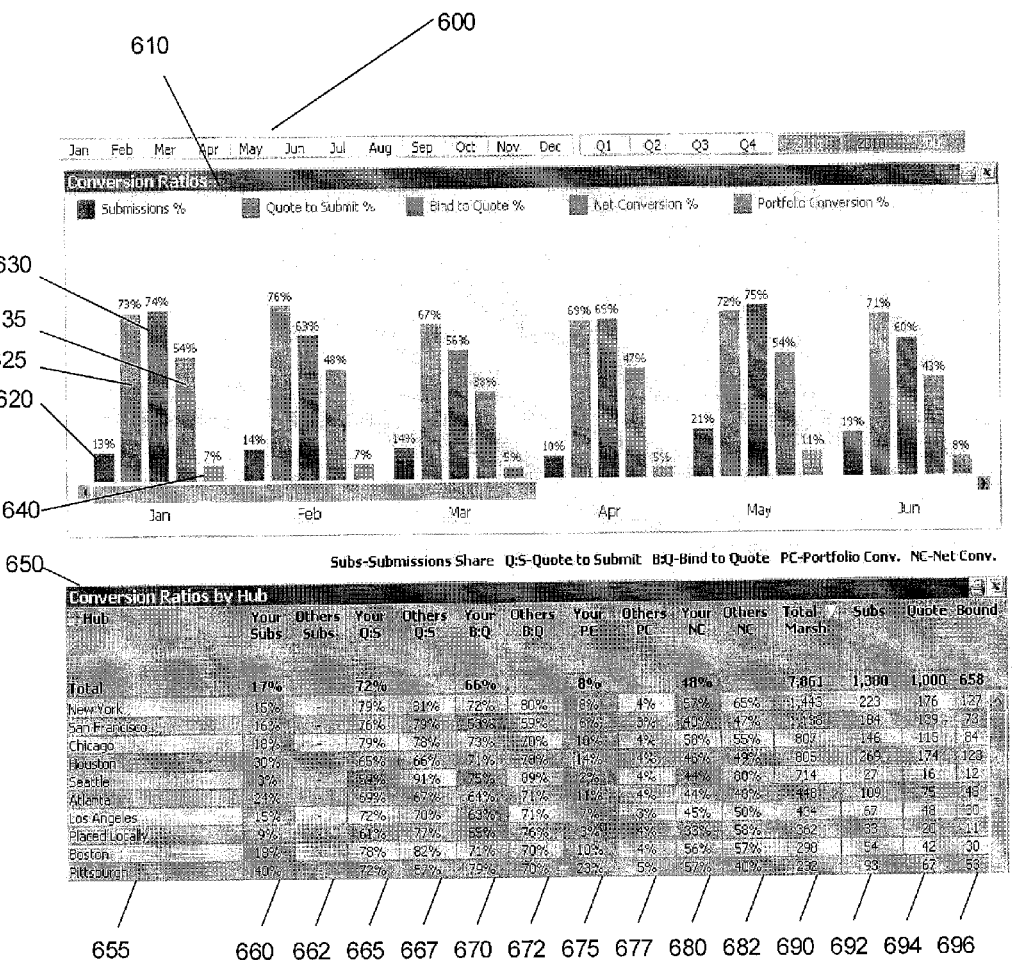
FIG. 6 shows an exemplary result view GUI for the search of the placement information by the historical tool.

FIG. 6 shows an exemplary result view GUI 600 for the search of the placement information 120 by the historical tool 150. In this exemplary result view GUI 600, the results are split into two views, the conversion ratio view 610 and the conversion ratio by hub view 650. The conversion ratio view 610 shows the global results for the selected criteria by month for the insurance company. For example, referring to the month labeled as January in conversion ratio view 610, the submission percentage 620 is 13%. This means that the insurance company was selected for submission 13% of the time in January for policies that matched the selected search criteria. The quote percentage 625 is 73%. This means that the insurance company decided to quote 73% of the policies that were submitted to it in January. The binding percentage 630 is 74%. This means the client selected the insurance company to bind the policy 74% of the time the insurance company quoted the policy in January. The net conversion percentage 635 is 54%. This means the number of bound accounts versus the number of submissions to the insurance company. The portfolio conversion percentage is 7%. This means the number of bound accounts versus the total number of submissions by the broker.

The remainder of the conversion ratio view 610 shows the same data for the remaining months of the selected time frame. Those skilled in the art will understand that the selected time frame in the conversion ratio view 610 is only exemplary and any time frame may be used (e.g., quarterly, yearly, etc.). It is also noted that the conversion ratio view 610 only shows the performance of the user's insurance company. That is, this portion of the view only provides the statistics for the user's insurance company, but not a comparison with other insurance companies.

In contrast, the conversion ratio by hub view 650 shows both the performance of the user's insurance company, but also the performance of the insurance company's peers for the selected criteria. In this particular view, the insurance company user has selected to view the comparison based on the broker's placement hubs. However, the user can select any of the information in the placement information 120 to display the results. For example, the insurance company user may desire to view the results based on the policy value, the number of employees in the client, the industry group, the product group, the product sub-group, coverage line, client segment, etc. Thus, there may be any number of views corresponding to the conversion ratio by hub view 650 for the other types of information that may be used to view the results as selected by the user.

However, for the purposes of illustration, the conversion ratio by hub view 650 will be described in more detail. The first column 655 is a listing of the placement hubs for the particular broker. The second column 660 is the submission percentage for both the total company and by individual hub. It is noted that the total submission percentage of 17% does not match any of the individual months shown in the conversion ratio view 610 because this percentage is the overall percentage for the selected time period, in this case the six-month period. The individual submission percentage for each of the hubs is also shown for the same selected time period. As described above, the selected time period may be any time period.

The third column 662 is the average submission percentage for other peer insurance companies. In this case, this column is blank because the particular insurance company is not being permitted to access this information at this view level. That is, in this example, an administrator has decided that this type of information is to be displayed only at the coverage level and not at any of the higher levels. Thus, if a user were to drill down from the placement hub level to a coverage level, the information on peer submissions would be reflected. However, this decision is only applicable to this example. The information on peer submissions can also be displayed at this level if the system administrator decides that such information should be displayed. Thus, if the user were allowed to see this information, the percentages based on the placement hubs for the peer insurance companies, in the aggregate, would be displayed.

The fourth column 665 is the quote percentage by each broker placement hub. As described above, the quote percentage is derived based on the number of quotes that the insurance company provides against the number of submissions the insurance company receives. The fifth column 667 is the average quote percentage by each placement hub for the peer insurance companies. In this case, the insurance company user 160-180 may compare their quote percentage to the average quote percentage for all peer companies. To provide a specific example displayed in the conversion ratio by hub view 650, the quote percentage for New York is 79%, while the peer average quote percentage is 81%. Thus, in this case, the insurance company user 160-180 can see that while their percentage is less than the average, it is very close to the average of what their competitors are quoting.

However, for the Seattle placement hub, the insurance company has a quote percentage of 59% versus the peer average quote percentage of 91%. In this case, the insurance company user 160-180 can see that their quote percentage is much less than the average. The conversion ratio by hub view 650 may indicate this negative quote percentage to the insurance company user by, for example, highlighting the percentage in red, flashing the percentage on the display, bolding the percentage or any other means of highlighting the negative quote percentage to the user. The amount of negative percentage that results in highlighting may be set either by the administrator of the broker arrangement 110 or by the individual user. For example, the user may desire to know when its negative quote percentage is 10% or more lower than its peer average. It should be apparent to those skilled in the art that such information may be very valuable to the insurance company because they may then be able to either internally or through interaction with the broker, determine the reasons for their quote percentage being so low compared to their peers.

Referring back to the columns 665 and 667 for the Pittsburgh placement hub, the insurance company has a quote percentage of 72% versus the peer average quote percentage of 57%. In this case, the insurance company user 160-180 can see that their quote percentage is higher than the average. Again, this positive percentage may be highlighted in a similar manner as the negative percentage described above. Also, this information may also be useful to the insurance company because they may be able to determine why they are outperforming their peers as to this placement hub and transfer these practices in dealing with other placement hubs.

The columns 670 and 672 show the insurance company's binding percentage and the peer average binding percentage, respectively. Again, as described above, the binding percentage is determined based on the number of clients that select the carrier versus the number of quotes provided by the carrier. The percentages may be highlighted in the same manner described above for the quote percentages and also may be used by the insurance company to determine reasons for positive and/or negative performance versus their peers in binding policies.

The columns 675 and 677 show the insurance company portfolio conversion percentage and the peer average portfolio conversion percentage, respectively. The columns 680 and 682 show the insurance company net conversion percentage and the peer average net conversion percentage, respectively. These conversion percentages may be highlighted in the same manner described above for the quote percentages and also may be used by the insurance company to determine reasons for positive and/or negative performance versus their peers in binding policies.

The final four columns show the number of broker submissions 690, the number of submissions sent to the insurance company 692, the number of quotes provided by the insurance company 694 and the number of bound policies based on these quotes 696.

Figure 7:
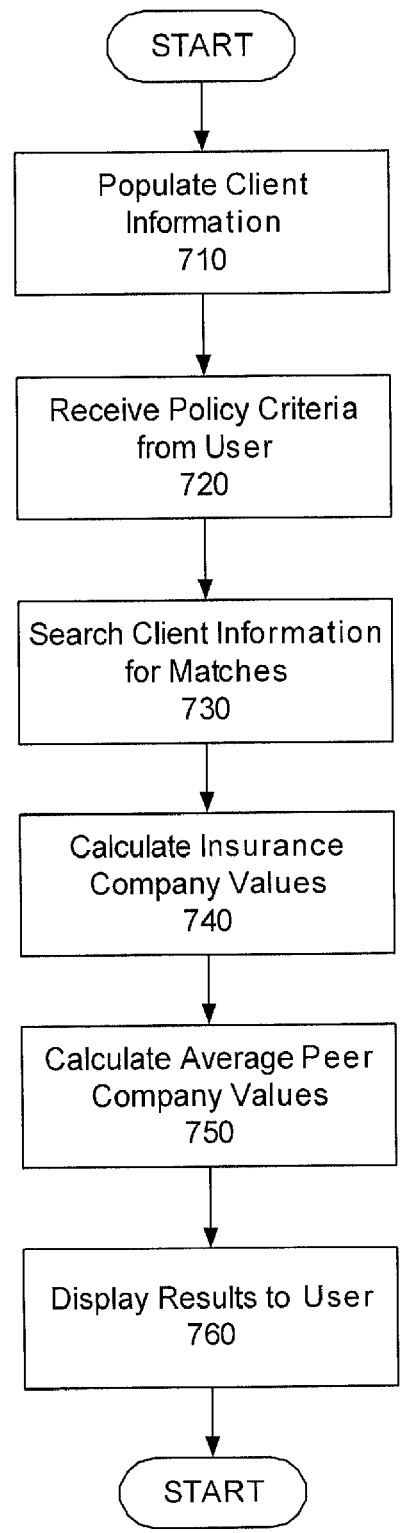
FIG. 7 shows an exemplary method for operation of the historical tool.

FIG. 7 shows an exemplary method 700 for operation of the historical tool 150. In a first step 710, the placement information 120 is populated. It is noted that while this method is described as an exemplary operation of the historical tool 140, it is possible that the placement information 120 is populated via an unrelated operation as described above with reference to the method 500 for the opportunity tool 140. This step 710 is provided in this method 700 to indicate that the historical tool 150 will operate on the information that is available in the placement information 120.

In a next step 720, the historical tool 150 receives policy criteria from the insurance company user 160-180, for example, via the GUI 200. As described extensively above for the opportunity tool 140, the historical tool 150 also allows the insurance company user 160-180 to select the specific criteria for the historical information that the insurance company desires to analyze. More specifically, it is possible that the insurance company user 160-180 may enter the criteria into the GUI 200 and this information is sent to both the opportunity tool 140 and the historical tool 150, thereby resulting in both the forward looking opportunity information and the backward looking historical information being displayed to the insurance company user 160-180.

After receiving the criteria from the insurance company user 160-180, the method proceeds to step 730 where the historical tool 150 searches the placement information 120 for policy information that matches the criteria. In step 740, the historical tool 150 calculates the historical values for the insurance company's performance. For example, as described above, the calculations may include the determination of the number of submissions to the insurance company, the number of quotes provided by the insurance company, the number of policies bound by the insurance company, the submission percentage for the insurance company, the quote percentage for the insurance company, the binding percentage for the insurance company, etc.

Similarly, in step 750, the historical tool 150 will calculate the corresponding peer average values for the peer insurance companies. For example, as described above, the calculations may include the determination of the number of submissions to each peer insurance company, the number of quotes provided by the peer insurance companies, the number of policies bound by the peer insurance companies, the peer average submission percentage, the peer average quote percentage, the peer average binding percentage, etc.

In step 760, the historical tool 150 provides the results to the insurance company user. The results may be provided, for example, via the GUI 600. In addition, the results may also be provided to the broker user 190 so that the insurance company may consult with the broker regarding the historical information and specifically, variations from the peer averages identified by the historical tool 150. For example, as described above, the placement information 120 may include any number of different pieces of information. Thus, if an insurance company user 160-180 sees that their binding percentage varies negatively from the peer average binding percentages, the insurance company may be able to meet with the broker to understand the reasons for this variation. Reasons may include pricing issues, policy provision issues, servicing issues, etc. By understanding that there is an issue, this allows the insurance company to endeavor proactively to solve the issue, possibly in conjunction with the broker (who may also communicate clients' concerns).

Figure 9:
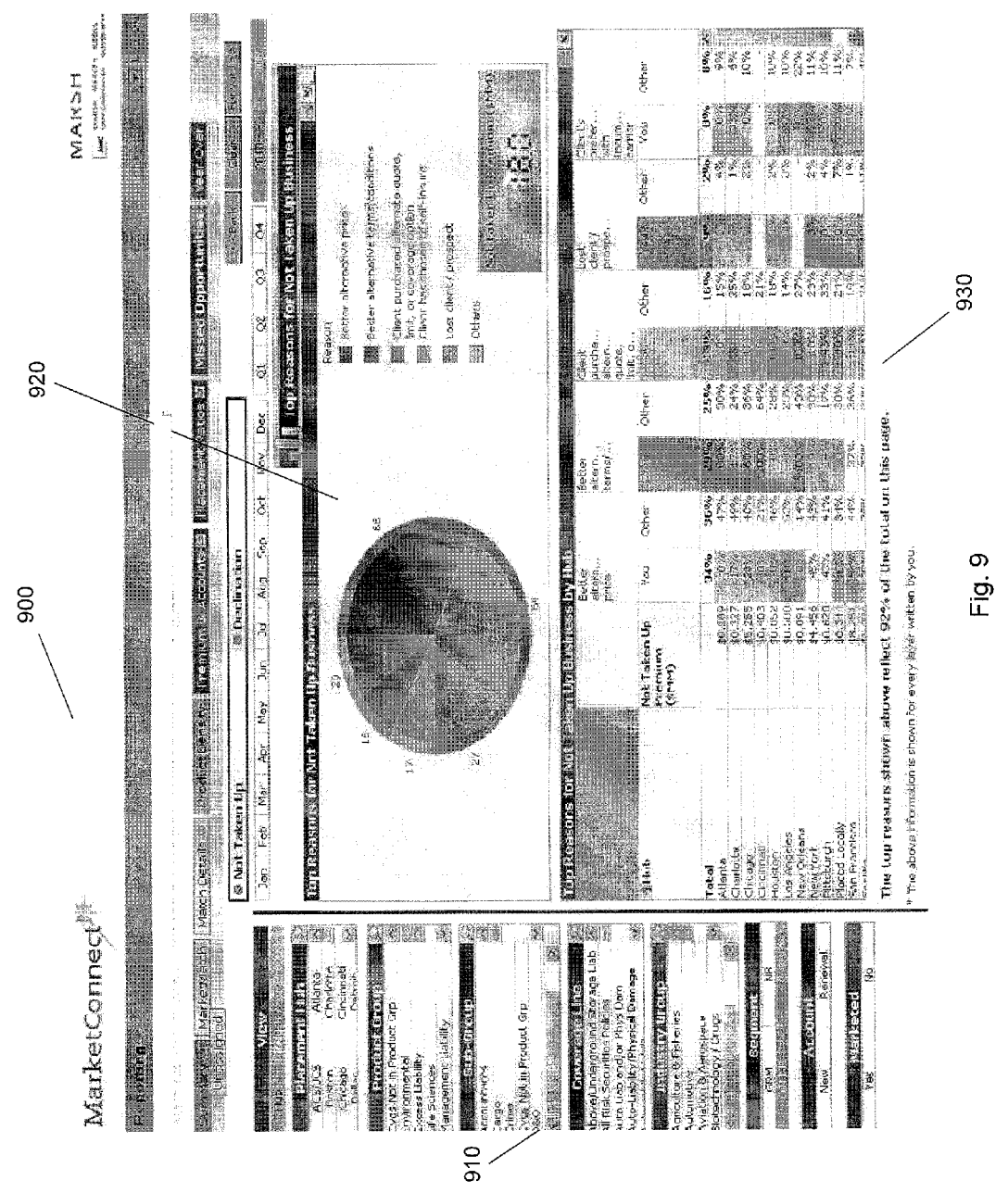

FIG. 9 shows an exemplary result view GUI 900 for the search of the placement information 120 by the historical tool 150 based on lost opportunities. As described extensively in this description, the placement information 120 may store any number of types of data. In this case, the placement information 120 stores not taken up information, e.g., information as to why a client decided not to bind a particular quote for a policy. Examples of reasons for such not taken up information include, but are not limited to, better alternative pricing, better alternative terms and conditions, client purchased alternate quote, limit or coverage option, client has chosen to self-insure, client decided to not bind any coverage through broker, etc. Thus, the historical tool 150 may also display the historical results based on these lost opportunities and, similar to the other types of data, the insurance company's performance against its peer insurance companies.

Similar to the other exemplary views, the insurance company user 160-180 has selected certain criteria to perform the search and this criteria is displayed in view portion 910. In view portion 920, the reasons why the insurance company's quotes were not taken is shown graphically via a pie chart for the selected time period and also includes a monetary value for the quotes that were declined.

The view portion 930 shows by placement hub, the percentages based on the reasons for the client declining the quote for both the insurance company associated with the insurance company user 160-180 and the average of the peer insurance companies. Similar to that described above, the values may be highlighted to indicate where the insurance company is performing better and/or worse than its peers. Also, this view 900 is again shown as being broken down based on placement hubs, but it is also possible to display the results based on other organizational data such as product group, industry group, etc.

In addition, the exemplary view shown in GUI 900 relates to the reasons that a policy was not taken up by the client when it was quoted by the insurance company. The placement information 120 may also store reasons why the insurance company decided not to quote a particular submission. This situation may be termed a "declination." Examples of reasons for declinations include, but are not limited to, the insurance company does not write this class of business, the insurance company does not believe they can be competitive for the policy, the insurance company cannot meet the specification requirements, the insurance company has decided that the catastrophe exposure is too high, the insurance company has decided that the attachment point is too low, etc. The historical tool 150 may also display these declinations in a similar manner to the reasons for not taken up policies as illustrated in FIG. 9, e.g., for the individual insurance company and for the peer insurance companies.

Those skilled in the art will understand that the lost opportunity data provides the insurance company with information that may be used to improve their client offerings, and insights on how often specific reasons apply to them versus the aggregate of their competitors to better understand their performance relative to that of other carriers. In addition, the broker user 190 in seeing this information allows the broker the ability to react to this information in a more timely manner, thereby creating a competitive advantage for the broker in dealing with insurers.

The above exemplary embodiments provided a number of examples of data that may be stored in the placement information 120 and may also be displayed as results based on searches of the placement information 120. However, as described above, these are only examples and there may be any number of additional types of information concerning policies that are stored and displayed by the broker arrangement 110. Some additional examples include: the placement information may also include data such as the number of submissions which the insurance company received, but did not respond to in any manner for a particular time period, the number of submissions which the insurance company received over a particular time period, but specifically declined to provide a quote for, the number of quotes that are outstanding, but for which no binder has yet been agreed, etc. From these examples, it should be clear to those skilled in the art that there are any number of types of data that may be stored in the placement information 120.

In addition, as described above, the view of the results that were shown were only exemplary and were provided based on the particular policy criteria that were entered for exemplary purposes. A wide variety of views of results are possible and these results views may be populated by any of the information that is stored in the placement information 120. Thus, based on the type of policy criteria entered by the user, the views of results may be varied to provide particular information based on those policy criteria. For example, if the policy criteria selected by the user focused on particular product groups, the information presented by the result view may be segmented into product groupings rather than placement hubs as shown in the exemplary result view 600 above.

While not a complete listing of all the advantages for the above described exemplary embodiments, it should be apparent that the exemplary embodiments provide a single source for critical performance information, allows insurers to focus on the opportunities that they want to write, provides a better understanding of bound and lost business, allowing insurers to improve their ratios in that regard, aids carriers to improve their product and service offerings, enables carriers to be considered for risks to which they had historically not been able to compete and aids insurers to identify the need for new products. On the broker side, the exemplary embodiments allow the broker to see real time market information to educate brokers in markets and carrier capabilities and increases the flow of critical information between carriers and brokers.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, etc. In a further example, the exemplary embodiments of the recognition and tracking module may be a program containing lines of code stored on a non-transitory computer readable storage medium that, when compiled, may be executed on a processor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
   storing, by a computing device, placement information for insurance policies placed with multiple insurance companies;
   receiving, by the computing device, a request from a first one of the insurance companies for data corresponding to a first subset of the insurance policies meeting policy criteria selection information, wherein at least a portion of the policy criteria selection information is unique to the first insurance company;

determining, by the computing device, a second subset of the first subset of insurance policies that are one of (a) scheduled to expire within a predetermined time frame, (b) scheduled to renew within the predetermined time frame and (c) scheduled for submission to insurance companies; within the predetermined time frame;

determining, by the computing device, historical information for the first subset of insurance policies including performance metrics for the first insurance company and performance metrics for other insurance companies from the multiple insurance companies, corresponding to the participation of or results of the insurance companies in various stages of the sales process for insurance policies in the first subset; and providing insurance policy data for the second subset of insurance policies and the historical information to the first insurance company, wherein the insurance policy data and historical information is organized based on the policy criteria selection information received from the first insurance company.

2. The method of claim 1, wherein the unique policy criteria selection information includes one of product group information, product subgroup information and industry group information.

3. The method of claim 1, further comprising:
correlating, by the computing device, the placement information with the unique policy criteria selection information.

4. The method of claim 1, further comprising:
providing, by the computing device, the insurance policy data and historical information to an insurance broker for the insurance policies.

5. The method of claim 4, wherein at least a portion of the insurance policy data for the second subset of insurance policies provided to the first insurance company is different from the insurance policy data for the second subset of insurance policies provided to the insurance broker.

6. The method of claim 1, wherein the placement information includes one of a type of each policy, an amount of each policy, provisions of each policy, a period of each policy, an owner of each policy, characteristics of an owner of each policy, insurance companies to which each policy was submitted, insurance companies that quoted each policy and characteristics of each quote for each policy.

7. The method of claim 1, wherein the policy criteria selection information includes one of a total insured value (TIV), an event specific TIV, a client market capitalization, a placement hub of the broker, a loss sensitive parameter and a guaranteed cost parameter.

8. The method of claim 1, wherein the performance metrics for the first insurance company includes one of a number of submissions received by the first insurance company, a number of quotes provided by the first insurance company, a number of bound policies by the first insurance company, a submission percentage which is based on a number of total submissions by an insurance broker and the number of submissions received by the first insurance company, a quote percentage which is based on the number of quotes provided by the first insurance company and the number of submissions received by the first insurance company, a binding percentage which is based on the number of bound policies by the first insurance company and the number of quotes provided by the first insurance company, a net conversion percentage which is based on the number of bound policies by the first insurance company and the number of submissions to the first insurance company and a portfolio conversion percentage which is based on the number of bound policies by the first insurance company and the number of submissions by the insurance broker.

9. The method of claim 1, wherein the average performance metrics for the other insurance companies is based on the policy criteria selection information received from the first insurance company and include a peer submission percentage which is based on a number of total submissions by an insurance broker and an average number of submissions received by the other insurance companies, a peer quote percentage which is based on an average number of quotes provided by the other insurance companies and the average number of submissions received by the other insurance companies and a peer binding percentage which is based on an average number of bound policies by the other insurance companies and the average number of quotes provided by the other insurance companies.

10. The method of claim 1, wherein the historical information is provided based on a predetermined time period which is one of selected by the first insurance company and preselected.

11. A system, comprising:
a memory storing placement information for insurance policies placed with multiple insurance companies; and
a processor configured to execute a set of instructions to perform a method comprising:
receiving a request from a first one of the insurance companies for data corresponding to a first subset of the insurance policies meeting policy criteria selection information, wherein at least a portion of the policy criteria selection information is unique to the first insurance company,
determining a second subset of the first subset of insurance policies that are one of (a) scheduled to expire within a predetermined time frame, (b) scheduled to renew within the predetermined time frame and (c) scheduled for submission to insurance companies within the predetermined time frame,
determining historical information for the first subset of insurance policies including performance metrics for the first insurance company and performance metrics for other insurance companies from the multiple insurance companies, corresponding to the participation of or results of the insurance companies in various stages of the sales process for insurance policies in the first subset, and
providing insurance policy data for the second subset of insurance policies and the historical information to the first insurance company, wherein the insurance policy data and historical information is organized based on the policy criteria selection information received from the first insurance company.

12. The system of claim 11, wherein the unique policy criteria selection information includes one of product group information, product subgroup information and industry group information.

13. The system of claim 11, wherein the method further comprises:
correlating the stored placement information with the unique policy criteria selection information.

14. The system of claim 11, wherein the policy criteria selection information includes one of a total insured value (TIV), an event specific TIV, a client market capitalization, a placement hub of the broker, a loss sensitive parameter and a guaranteed cost parameter.

15. The system of claim 11, wherein the method further comprises:

receiving the policy criteria selection information from a user via a first graphical user interface (GUI), to display the insurance policy data via a second GUI and to display the historical information via a third GUI.

16. The system of claim 11, wherein the method further comprises:

provinding the insurance policy data to an insurance broker for the insurance policies.

17. The system of claim 16, wherein the method further comprises:

providing a first graphical user interface (GUI) to display the insurance policy data for each insurance policy to the first insurance company and a second GUI to display the insurance policy data for each insurance policy to the insurance broker, wherein at least a portion of the insurance policy data displayed by the first GUI is different from the data displayed by the second GUI.

18. The system of claim 11, wherein the performance metric for the insurance company includes one of reasons why the insurance company failed to bind a quote to a client and reasons why the insurance company decided not to provide a quote for a submission.

* * * * *